E. PEDERSON.
VALVE SPRING COMPRESSING TOOL.
APPLICATION FILED DEC. 19, 1919.
1,360,440.
Patented Nov. 30, 1920.
2 SHEETS—SHEET 1.
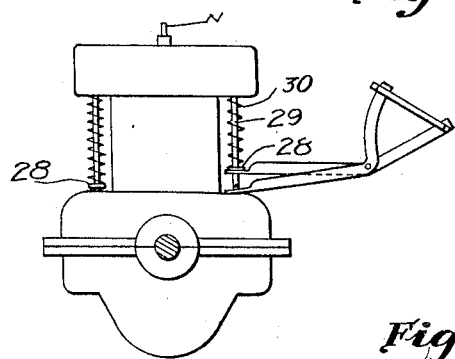
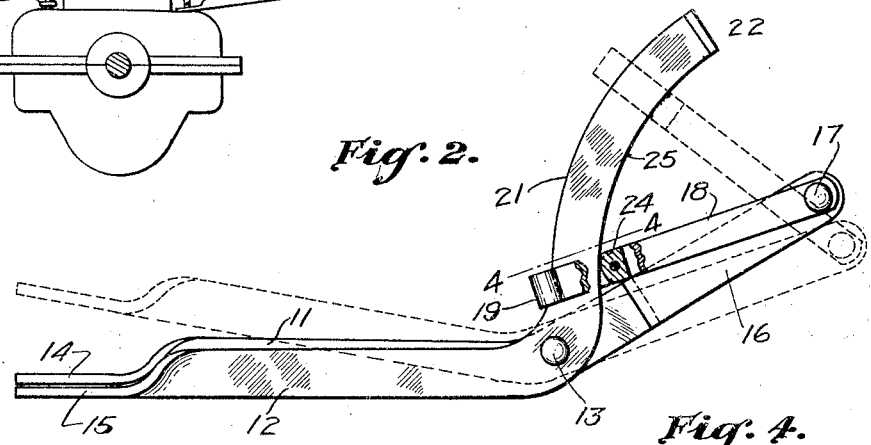
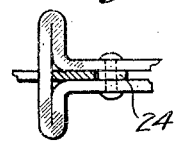
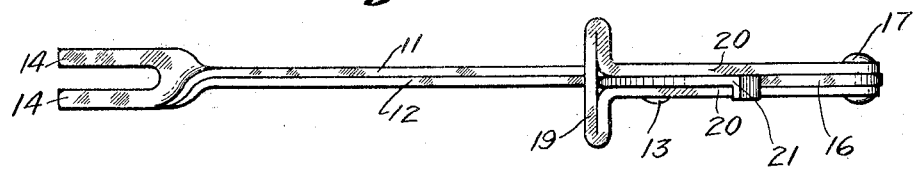
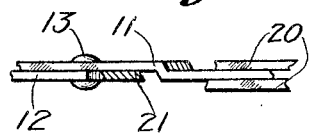
INVENTOR;
ELLING PEDERSON,
By Graham + Harris
ATTORNEYS.

E. PEDERSON.
VALVE SPRING COMPRES
APPLICATION FILED DEC. 19, 1919.
1,360,440.
Patented Nov. 30, 1920.
2 SHEETS—SHEET 2.
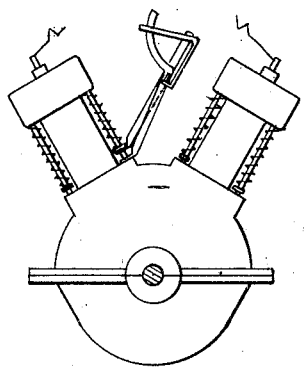
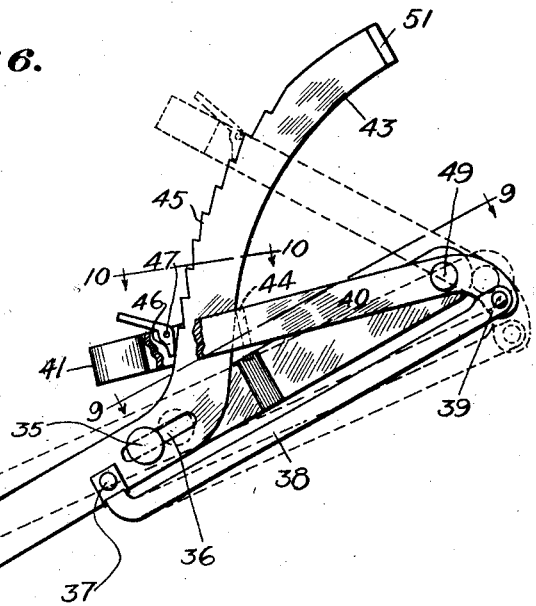
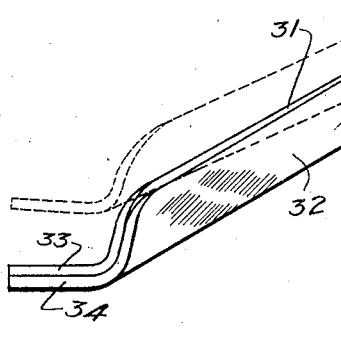
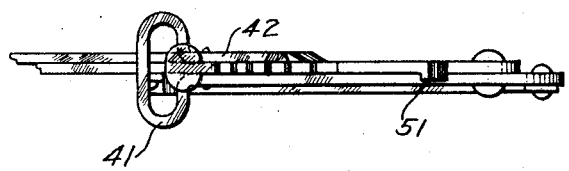
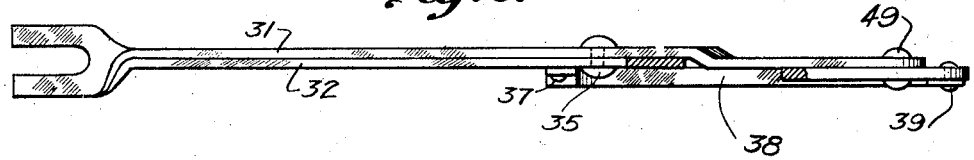
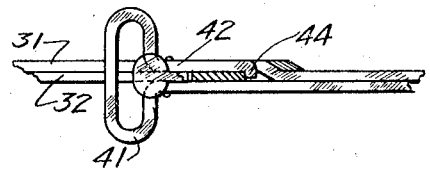
INVENTOR;
ELLING PEDERSON,
By Graham + Harris
ATTORNEYS.

UNITED STATES PATENT OFFICE.

ELLING PEDERSON, OF LOS ANGELES, CALIFORNIA.

VALVE-SPRING-COMPRESSING TOOL.

1,360,440.  Specification of Letters Patent.  Patented Nov. 30, 1920.

Application filed December 19, 1919. Serial No. 346,397.

*To all whom it may concern:*

Be it known that I, ELLING PEDERSON, a citizen of the United States, residing at Los Angeles, in the county of Los Angeles and State of California, have invented a new and useful Valve-Spring-Compressing Tool, of which the following is a specification.

My invention relates to tools used in automobile work, being more particularly a tool for compressing the valve spring of an internal combustion engine so that disconnections can be made for removing the valve.

The principal object of my invention is to provide a tool of the class described, of simple form and construction, by means of which the spring on the valve stem may be compressed, the tool operating along a line substantially parallel to the valve stem so that there is no danger of bending the same during such operation.

Another object of my invention is to provide a tool of the character described which may be operated to compress the valve spring to different positions, and when so operated, will remain in the position desired so that both hands of the workman may be free to perform the operation of removing the valve.

Other objects and advantages will appear hereinafter from the following description and the drawings.

Referring to the drawings which are for illustrative purposes only,

Figure 1 is a diagrammatic end view of an internal combustion engine in which the valve stems are vertically arranged, showing a tool embodying a form of my invention as used thereon.

Fig. 2 is an enlarged side view, partly in section, of the tool shown in Fig. 1, a portion of the same being in section.

Fig. 3 is a plan view of the tool shown in Fig. 2.

Fig. 4 is a sectional view on line 4—4, Fig. 2.

Fig. 5 is a fragmentary plan view, partly in section, of a portion of the tool.

Fig. 6 is a diagrammatic end view of an internal combustion engine in which the cylinders and valve stems are arranged at approximately sixty degrees to each other, showing a modified form of tool in use thereon.

Fig. 7 is an enlarged side elevation partly in section of the tool shown in Fig. 6.

Fig. 8 is a plan view of one end of the tool shown in Fig. 7.

Fig. 9 is a plan view partly in section on line 9—9, Fig. 7, and

Fig. 10 is a plan view partly in section on line 10—10, Fig. 7.

11 and 12 designate arms, preferably formed of flat bar iron, pivotally connected intermediate their length by means of a pin or bolt 13. The arm 11, which may be termed a lifting arm, and the arm 12, which may be termed a stationary arm, terminate at their forward ends in prongs 14 and 15 respectively, the arms at their forward end being bent at right angles so that the prongs 14 of the arm 11 lie flat upon the prongs 15 of the arm 12 when the tool is in inoperative position. The arm 11 has a rearwardly extending portion 16 to which is pivotally mounted by means of a pin or bolt 17 a lever 18. The lever 18 is formed of flat bar iron bent at its forward end to form a handle 19, the ends of the handle extending rearwardly on each side of the portion 16 of the arm 11 where they are engaged at their rear end by the pin or bolt 17 by which the lever is pivotally mounted as heretofore described. The ends 20 of the handle forming the lever 18 also inclose a curved extension 21 of the arm 12, the end of the extension being bent at right angles as indicated at 22 to prevent the lever from moving beyond the end of the extension.

Secured between the members 20, in any suitable manner, is a block 24 arranged to engage the curved inner face 25 of the extension 21 for the purposes hereinafter described.

The tool above described is operated in the following manner:

The prongs 14 and 15 are placed under the washer or collar 28 on the valve stem 29. The handle 19 is then pulled upwardly into the position shown in dotted lines in Fig. 2. This movement of the handle 19 swings the lever 18 upwardly, causing the bridge or block 24 to slide over the curved surface 25 of the extension 21 which forces the rear end 16 of the arm 11 to move downwardly thereby swinging the prongs 14 upwardly, which movement raises the washer on the valve stem thereby compressing the spring indicated at 30, it being understood that the prongs 15 are resting upon a fixed part of the engine. The friction of the block 24 against the curved surface 25 is sufficient to hold the lever into any position in which the same may be placed so that the tool will remain in open or expanded position until the operator positively moves the lever back to its original position.

The form of tool shown in Figs. 6 to 10 inclusive is especially designed to be used on engines of the type shown in Fig. 6 where the cylinders are set at an angle and the parts necessarily close. This type of tool consists of two arms 31 and 32 which terminate at their forward end in prongs 33 and 34 respectively, the arm 31 being termed a lifting arm and the arm 32 being termed a stationary arm. In this form of tool, however, the prongs, while arranged flat with relation to each other, are also angularly disposed with respect to the arms 31 and 32. Secured to the arm 31 is a headed pin 35 which extends through a slot 36 formed in the arm 32 so that the arms may have a pivotal movement with relation to each other and also a sliding movement for the purpose hereinafter described.

Pivotally mounted by means of a pin or bolt 37, to the arm 32, is a rod 38 to the rear end of which is pivotally connected by means of a pin or bolt 39 a lever 40, the lever 40 being preferably made of flat bar iron bent to form at its forward end a handle 41, the lever and the end 42 of the handle engaging over a curved extension 43 of the arm 32. The end 42 of the handle is bent to form a lug 44 which engages the curved extension 43. The extension 43 is provided with a series of teeth 45 arranged to be engaged by a pawl 46 pivotally mounted on a pin 47 carried on the lever 40. The inner or rear end of the arm 31 is pivotally connected by means of a pin or bolt 49 to the lever 40. The extension 43 of the arm 32 terminates in a bent portion 51 forming a stop for the lever 40.

This tool is used by placing the same with the prongs under the washer or collar on the valve stem, and when so placed the lever 40 is pivotally swung upwardly on the pin 39, the lug 44 operating against the extension 43, which motion swings the outer or forward end of the arm 31 upwardly into the dotted line position shown in Fig. 7. The arm 31, during the movement just described, has a sliding movement by virtue of the pin 35 moving in the slot 36 and at the same time a pivotal movement on such pin 35 so that the prongs 33 and 34, with relation to each other, have a substantially vertical movement as the same move apart.

The sliding and pivotal movement of the arm 31 is due to the fact that the lever 40 is pivotally mounted on the rod 38 and the rear end of the arm pivotally connected to the lever 40. The lever 40 in this form of tool is held in any desired position by means of the pawl 46 which engages the teeth 45.

It is to be understood that the prongs 34 rest upon a fixed portion of the engine and the prongs 33 move upwardly and compress the spring on the valve stem.

I claim as my invention:—

1. A valve spring compressing tool comprising two pivotally connected members each terminating at one end in prongs, a curved extension on one member, and a lever pivotally mounted on the other member arranged to engage said curved extension to swing the ends of said members apart.

2. A valve spring compressing tool comprising two pivotally connected members each terminating at one end in prongs, a curved extension on one member, a lever pivotally mounted on the other member, and means on said lever arranged to engage said curved extension to move said arms apart.

3. A valve spring compressing tool comprising a lifting arm and a stationary arm each terminating at its forward end in a pair of prongs, said stationary arm having a slot therein, a pin on the lifting arm extending through said slot, a bar pivotally mounted on said stationary arm, a curved extension on said stationary arm, a lever pivotally mounted on said bar arranged to engage the curved extension on the stationary arm to move said arms apart, and means for pivotally connecting said lifting arm to said lever.

4. A valve spring compressing tool comprising a lifting arm and a stationary arm each terminating at its forward end in a pair of prongs, said stationary arm having a slot therein, a pin on the lifting arm extending through said slot, a bar pivotally mounted on said stationary arm, a curved extension on said stationary arm, a lever pivotally mounted on said bar, a lug on the lever arranged to engage said extension to move said arms apart, and means for pivotally connecting said lifting arm to said lever.

5. A valve spring compressing tool comprising a lifting arm and stationary arm, each terminating at its forward end in a pair of prongs, means for pivotally and slidably connecting said arms together, a curved extension formed on the stationary arm, a bar pivotally mounted on the stationary arm, a lever pivotally mounted on said bar, a pivotal connection between said lifting arm and said lever, and means on said lever engaging said curved extension to operate said arms.

In testimony whereof, I have hereunto set my hand at Los Angeles, California, this 8 day of December, 1919.

ELLING PEDERSON.